United States Patent
Xu et al.

(10) Patent No.: US 12,123,992 B1
(45) Date of Patent: Oct. 22, 2024

(54) HIGH GEOSTRESS FAULT SIMULATOR USING NON-SOIL ROCK MATERIALS MEDIA

(71) Applicant: JIANGHAN UNIVERSITY, Wuhan (CN)

(72) Inventors: Longjun Xu, Wuhan (CN); Haoyu Wu, Wuhan (CN); Heng Zhang, Wuhan (CN); Guochen Zhao, Wuhan (CN); Qihan Xu, Wuhan (CN); Lili Xie, Wuhan (CN)

(73) Assignee: JIANGHAN UNIVERSITY, Wuhan (CN)

( * ) Notice: Subject to any disclaimer, the term of this patent is extended or adjusted under 35 U.S.C. 154(b) by 0 days.

(21) Appl. No.: 18/676,119

(22) Filed: May 28, 2024

(30) Foreign Application Priority Data

Sep. 22, 2023 (CN) .......................... 202311227902.4

(51) Int. Cl.
 *G01V 1/28* (2006.01)
(52) U.S. Cl.
 CPC .................................. *G01V 1/282* (2013.01)
(58) Field of Classification Search
 CPC ...................................................... G01V 1/282
 See application file for complete search history.

(56) References Cited

FOREIGN PATENT DOCUMENTS

| CN | 104575223 | B | * | 9/2015 | ............. G09B 23/40 |
|---|---|---|---|---|---|
| CN | 115266376 | A | * | 11/2022 | |
| CN | 115273634 | A | | 11/2022 | |
| CN | 112302601 | B | * | 2/2023 | ............. E21B 43/26 |
| CN | 115876597 | A | | 3/2023 | |

OTHER PUBLICATIONS

Machine translation of CN112302601B (Year: 2023).*
Machine translation of CN115266376A (Year: 2022).*
Machine translation of CN104575223B (Year: 2015).*

* cited by examiner

*Primary Examiner* — Lee E Rodak
*Assistant Examiner* — Sangkyung Lee
(74) *Attorney, Agent, or Firm* — Nitin Kaushik (57) ABSTRACT

Provided is a high geostress fault simulator using non-soil rock materials media, including a first movable unit, a second movable unit, and a stress simulation unit, where the first movable unit includes a first support platform and a second support platform, the second movable unit includes a first movable box, a second movable box, and an accommodation space, and the stress simulation unit includes support frames and stress simulation assemblies in which a to-be-tested model is disposed. The present invention simulates a stress level of a soil mass in a deep formation through the stress simulation unit, thereby simulating triaxial fault effects occurring in the deep formation through the simulator, and further studying an impact of triaxial earthquake fault effects on civil engineering structures under a stress of the soil mass in the deep formation when an earthquake occurs.

1 Claim, 6 Drawing Sheets

FIG. 6

HIGH GEOSTRESS FAULT SIMULATOR USING NON-SOIL ROCK MATERIALS MEDIA

CROSS-REFERENCE TO RELATED APPLICATIONS

The application claims priority to Chinese patent application No. 2023112279024, filed on Sep. 22, 2023, the entire contents of which are incorporated herein by reference.

TECHNICAL FIELD

The present invention relates to the technical field of research and development of earthquake fault simulation apparatuses, and in particular, to a high geostress fault simulator using non-soil rock materials media.

BACKGROUND

In scientific research related to earthquake faults nowadays, physical apparatuses for simulating various earthquake fault conditions are crucial. However, most earthquake fault simulation apparatuses in the prior art simulate faults in the earth's surface, and there is a lack of simulation of faults in a deep formation, especially simulation of a stress level of a to-be-tested model in a soil mass of the deep formation.

Therefore, a high geostress fault simulator using non-soil rock materials media that can both simulate the stress level in the soil mass of the deep formation and study an impact of triaxial earthquake fault dislocation on civil engineering structures is an urgent need in this field.

SUMMARY

In view of the above problems, the present invention aims to provide a high geostress fault simulator using non-soil rock materials media to solve at least one of the above technical problems.

In order to solve at least the above technical problems, the present invention provides a high geostress fault simulator using non-soil rock materials media to simulate a stress level in a soil mass of a deep formation and study an impact of triaxial earthquake fault dislocation on a to-be-tested model, and the simulator is disposed in a foundation pit, where the simulator includes: a first movable unit, where the first movable unit includes a first support platform and a second support platform, the bottom of the first support platform and the bottom of the second support platform are slidably connected to the bottom of the foundation pit, and the first support platform and the second support platform are arranged adjacent to each other and movably connected to enable the first support platform and the second support platform to move relative to or toward each other; a second movable unit, where the second movable unit includes a first movable box and a second movable box, the interiors of both the first movable box and the second movable box are hollow structures, and the first movable box and the second movable box are in contact to form an accommodation space through the hollow structures; and a stress simulation unit, where the stress simulation unit is arranged in the accommodation space and includes a plurality of stress simulation assemblies enclosed at a preset gap to form a placement zone for placing the to-be-tested model and a pressurization zone for enveloping the periphery of the placement zone, and the stress simulation assemblies are fixedly connected to an inner wall of the first movable box or an inner wall of the second movable box, where the first movable box is arranged at the top of the first support platform and movably connected to the first support platform, the movement direction of the first movable box relative to the first support platform is perpendicular to the movement direction of the first support platform relative to the second support platform, and the second movable box is arranged at the top of the second support platform and drivably connected to the second support platform.

Preferably, each of the stress simulation assemblies includes: an arc-shaped pressurizer arranged in the accommodation space; and a plurality of seventh hydraulic cylinders spaced apart on an outer wall of the arc-shaped pressurizer along an axis direction of the arc-shaped pressurizer, each with an output end fixedly connected to the outer wall of the arc-shaped pressurizer and a fixed end opposite to the output end fixedly connected to the inner wall of the first movable box or the inner wall of the second movable box.

Preferably, each of the arc-shaped pressurizers includes: a first arc-shaped plate with a convex face fixedly connected to the output end of the seventh hydraulic cylinder; a second arc-shaped plate distributed concentrically with the first arc-shaped plate; and a plurality of springs with one end fixed on a concave face of the first arc-shaped plate along an axis direction of the first arc-shaped plate and the other end fixed on a convex face of the second arc-shaped plate along an axis direction of the second arc-shaped plate to form the pressurization zone by the first arc-shaped plate and the second arc-shaped plate, where the plurality of arc-shaped pressurizers are arranged around the periphery of the to-be-tested model and surrounded by a plurality of the corresponding second arc-shaped plates to form the placement zone, and the to-be-tested model is disposed in the placement zone to press against the second arch-shaped plates to cause the second arc-shaped plates to move relatively in the pressurization zone.

Preferably, the number of the arc-shaped pressurizers is 4, and the 4 arc-shaped pressurizers are distributed symmetrically with an axis direction of the to-be-tested model as the central axis.

Preferably, a rubber pad is provided on a concave face of the second arc-shaped plate so that the to-be-tested model abuts against the concave face of the second arc-shaped plate through the rubber pad.

Preferably, the top of the first movable box is an opening provided with a detachable first top plate, and the top of the second movable box is also an opening provided with a detachable second top plate.

Preferably, a first transparent glass plate is provided on a side of the first movable box away from the second movable box so that the to-be-tested model inside the accommodation space is observable through the first transparent glass plate; and/or a second transparent glass plate is provided on a side of the second movable box away from the first movable box so that the to-be-tested model inside the accommodation space is observable through the second transparent glass plate.

Preferably, a first guide rail is arranged between the bottom of the first support platform and the bottom of the foundation pit, with a fixed part thereof fixedly installed at the bottom of the foundation pit and a movable part thereof fixedly installed at the bottom of the first support platform, and the fixed part is embedded in the movable part and can slide relative to the movable part; a second guide rail is arranged between the bottom of the second support platform and the bottom of the foundation pit, with a fixed part thereof fixedly installed at the bottom of the foundation pit and a movable part thereof fixedly installed at the bottom of the second support platform, and the fixed part is embedded in the movable part and can slide relative to the movable part; a third guide rail is arranged at a movable connection between the first movable box and the first support platform, with a fixed part thereof fixedly installed on the first support platform and a movable part thereof fixedly installed on the first movable box, and the fixed part is embedded in the movable part and can slide relative to the movable part; and a fourth guide rail is arranged on side walls of the second movable box and the foundation pit, with a fixed part thereof fixedly installed on the side wall of the foundation pit and a movable part thereof fixedly installed on the side wall of the second movable box, and the fixed part is embedded in the movable part and can slide relative to the movable part, where the first guide rail and the second guide rail are arranged in parallel so that the first support platform can move relative to or toward the second support platform, the first guide rail, the third guide rail, and the fourth guide rail are arranged perpendicular to each other in pairs, and the first guide rail is arranged parallel to the telescopic direction of the third hydraulic cylinder.

Preferably, a plurality of first hydraulic cylinders are provided between a side wall of the first support platform and the side wall of the foundation pit, each with a fixed end fixedly connected to the side wall of the foundation pit and an output end fixedly connected to the side wall of the first support platform; a plurality of second hydraulic cylinders are provided between a side wall of the second support platform and the side wall of the foundation pit, each with a fixed end fixedly connected to the side wall of the foundation pit and an output end fixedly connected to the side wall of the second support platform; and a third hydraulic cylinder and a fourth hydraulic cylinder are connected between the first support platform and the second support platform, the third hydraulic cylinder has a fixed end fixedly connected to another side wall of the first support platform and an output end fixedly connected to another side wall of the second support platform, and the fourth hydraulic cylinder has an output end fixedly connected to another side wall of the first support platform and a fixed end fixedly connected to another side wall of the second support platform, where the telescopic directions of the first hydraulic cylinders, the second hydraulic cylinders, the third hydraulic cylinder, and the fourth hydraulic cylinder are parallel.

Preferably, a plurality of fifth hydraulic cylinders are provided between a side wall of the first movable box adjacent to the second movable box and the side wall of the foundation pit, each with a fixed end fixedly connected to the side wall of the foundation pit and an output end fixedly connected to the side wall of the first movable box, and the telescopic direction of the fifth hydraulic cylinders is perpendicular to that of the first hydraulic cylinders; and a plurality of sixth hydraulic cylinders are provided inside the second support platform, each with a fixed end fixed to the bottom of the second support platform and an output end fixedly connected to the bottom of the second movable box so that the sixth hydraulic cylinders drive the second movable box to move relative to the first movable box, where the telescopic directions of the sixth hydraulic cylinders, the first hydraulic cylinders, and the fifth hydraulic cylinders are spatially perpendicular to each other in pairs.

Compared with the prior art, the present invention has the following beneficial effects:

specifically, in the high geostress fault simulator using non-soil rock materials media provided by the present invention, by enclosing the plurality of stress simulation assemblies at the preset gap to form the pressurization zone and the placement zone, placing the to-be-tested model in the placement zone formed by the stress simulation assemblies, and arranging the pressurization zone to envelope the periphery of the placement zone to provide surrounding pressure effects to the to-be-tested model in the placement zone through the pressurization zone, a stress level in a soil mass of a deep formation is simulated for the to-be-tested model through the stress simulation assemblies, thereby simulating stress effects on civil engineering structures when they are in the deep formation, and by the accommodation space formed by the first movable box and the second movable box, an accommodation space and a test environment are provided for the to-be-tested model and the stress simulation assemblies; by arranging the first support platform and the second support platform to be movably connected and both move relative to the foundation pit, the first support platform and the second support platform can also move relative to or toward each other while moving relative to the foundation pit, and by movably arranging the first movable box on the first support platform and the second movable box on the second support platform, a relative or opposite movement between the first support platform and the second support platform drives a relative or opposite movement between the first movable box and the second movable box to form a fault effect in a first direction on the to-be-tested model inside the first movable box and the second movable box; by moving the first movable box relative to the first support platform, the first movable box moves relative to the second movable box, thereby forming a fault effect in a second direction on the to-be-tested model inside the first movable box and the second movable box; and by drivably connecting the second movable box to the second support platform, the second movable box moves relative to the first movable box under a driving action, thereby forming a fault effect in a third direction on the to-be-tested model inside the first movable box and the second movable box, where the first direction, the second direction and the third direction of the above-mentioned fault effects are spatially perpendicular to each other in pairs, thereby simulating triaxial fault effects occurring in the deep formation, and further studying an impact of triaxial earthquake fault effects on civil engineering structures under a stress of the soil mass in the deep formation when an earthquake occurs.

The above description is only an overview of the technical solutions of the present invention, and in order to understand the technical means of the present invention more clearly to implement them in accordance with the content of the specification, and to make the above-described and other objectives, features, and advantages of the present invention more obvious and understandable, the implementation manners of the present application are illustrated below.

BRIEF DESCRIPTION OF DRAWINGS

To illustrate the technical solutions in the embodiments of the present invention or in the prior art more clearly, the following briefly introduces the accompanying drawings to be used for describing the embodiments. Obviously, the accompanying drawings in the following description only show some embodiments of the present invention, and those skilled in the art may still derive other accompanying drawings from these accompanying drawings without creative efforts.

REFERENCE SIGNS

1: first movable unit; 11: first support platform; 12; second support platform;
2: second movable unit; 21: first movable box; 211: first top plate; 212: first transparent glass plate; 22: second movable box; 221: second top plate; 222: second transparent glass plate; 23: accommodation space;
3: stress simulation assembly; 31: arc-shaped pressurizer; 311: first arc-shaped plate; 312: second arc-shaped plate; 313: spring; 314: rubber pad; 32: seventh hydraulic cylinder;
41: first guide rail; 42: second guide rail; 43: third guide rail; 44: fourth guide rail;
51: first hydraulic cylinder; 52: second hydraulic cylinder; 53: third hydraulic cylinder; 54: fourth hydraulic cylinder; 55: fifth hydraulic cylinder; 56: sixth hydraulic cylinder; and
6: to-be-tested model.

DETAILED DESCRIPTION OF THE EMBODIMENTS

The technical solutions in the embodiments of the present invention are clearly and completely described below with reference to the accompanying drawings in the embodiments of the present invention. Obviously, the described embodiments are only some but not all of the embodiments of the present invention. All other embodiments obtained by those skilled in the art in accordance with the embodiments of the specification shall fall within the protection scope of the present invention; and the term "and/or" involved in the implementation represents both situations of "and" and "or", in other words, A and/or B mentioned in the embodiments of the specification represent two situations: A and B, A or B, and describe three states in which A and B exist, for example, A and/or B represents that only A rather than B is included; only B rather than A is included; and both A and B are included.

Also, in the embodiments of the specification, when an assembly is said to be "connected" to another assembly, it may be directly connected to the other assembly or an intervening assembly may exist at the same time. When an assembly is said to be "disposed" on another assembly, it may be directly disposed on the other assembly or an intervening assembly may exist at the same time.

The following illustrates the implementation manners of the present invention through embodiments, and those skilled in the art can easily understand other advantages and beneficial effects of the present invention from the content disclosed in the specification. The present invention can also be implemented or applied in other different implementation manners, and various details in the specification can also be modified or changed in various ways in accordance with different ideas and applications without departing from the spirit of the present invention.

It should be noted that in order to provide a more detailed description of the specification so that those skilled in the art can understand the specification more clearly, thereby supporting the technical problems to be solved by the specification and the corresponding achievable technical effects, before introducing the specification, it is necessary to describe the following:

Embodiment I

Figure 1:
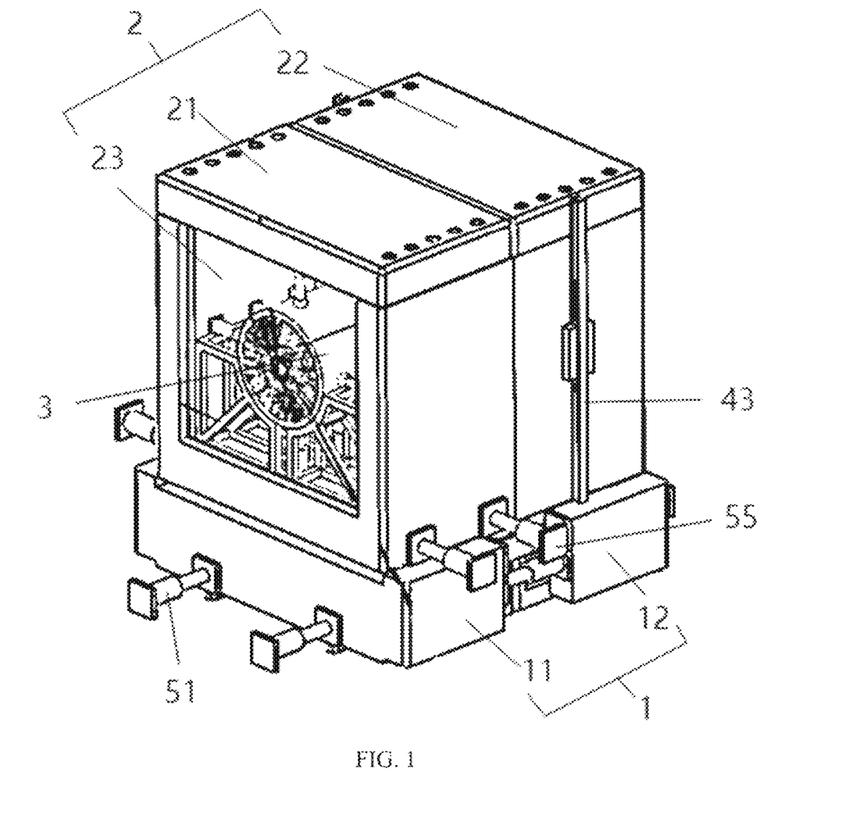
FIG. 1 is a schematic three-dimensional structural diagram of a high geostress fault simulator using non-soil rock materials media in accordance with the present invention.
Figure 2:
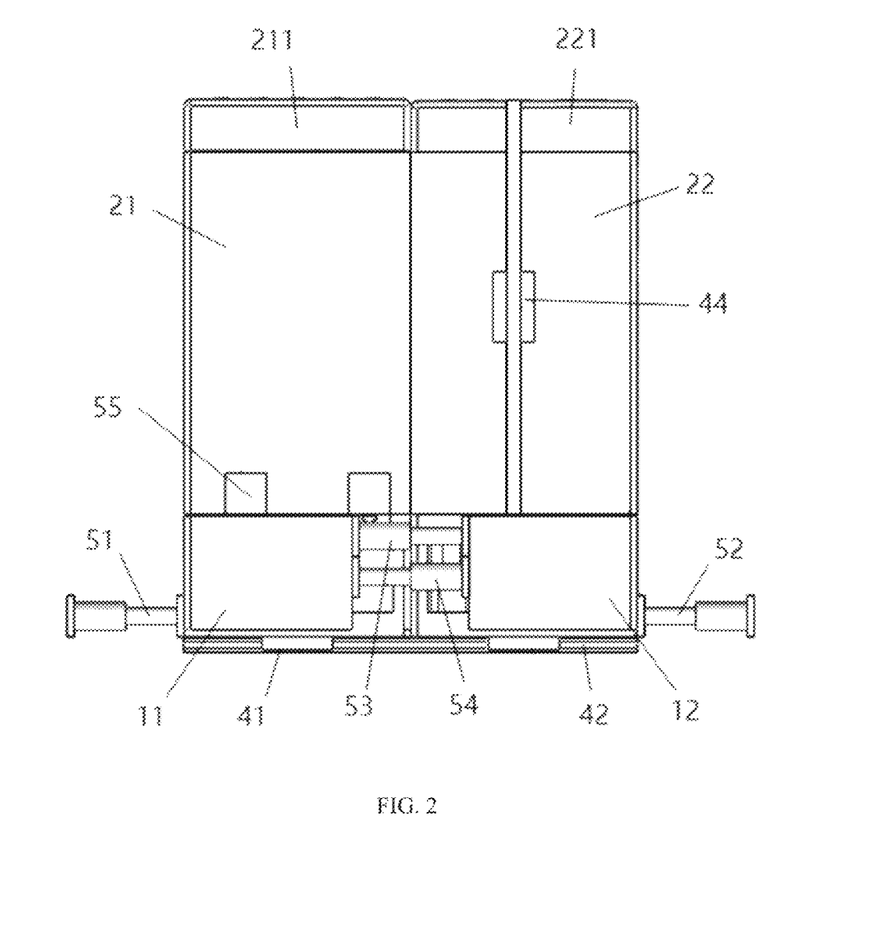
FIG. 2 is a right view of a high geostress fault simulator using non-soil rock materials media in accordance with the present invention.
Figure 3:
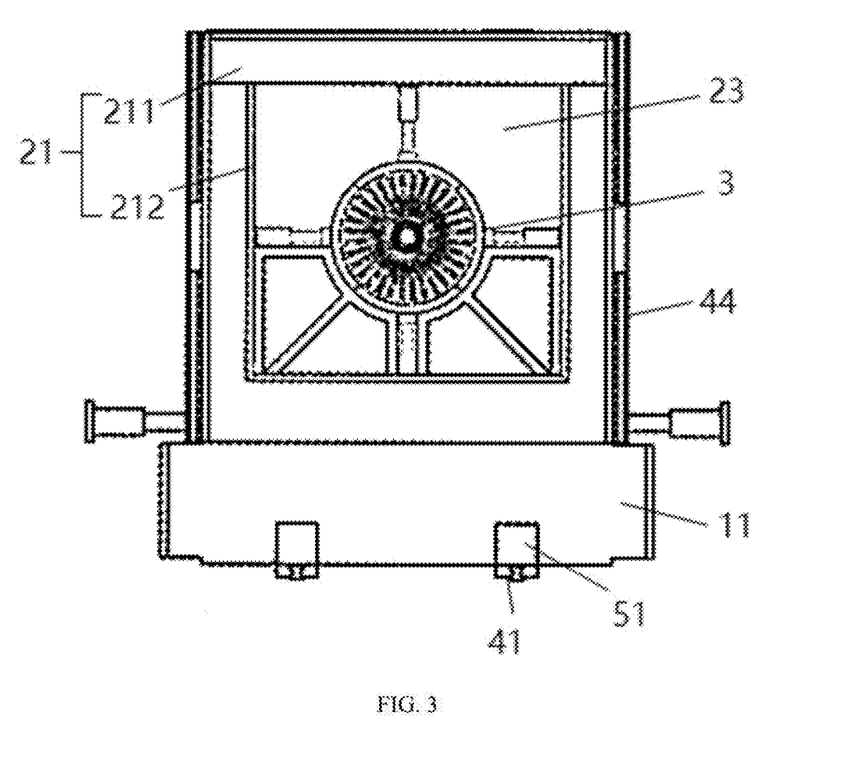
FIG. 3 is a front view of a high geostress fault simulator using non-soil rock materials media in accordance with the present invention.
Figure 6:
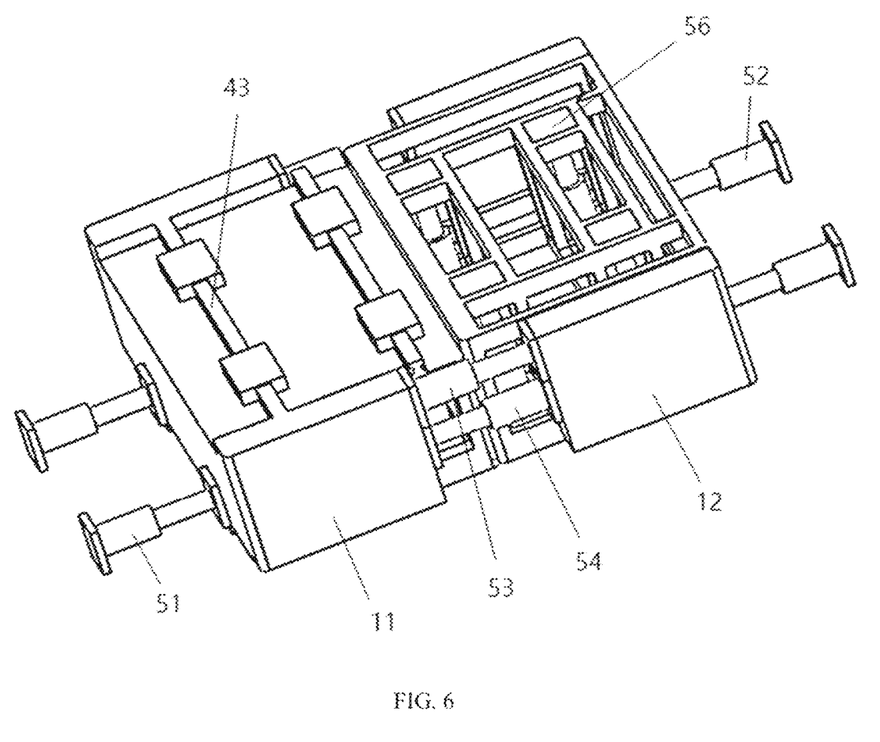
FIG. 6 is a schematic structural diagram of a first movable unit in accordance with the present invention.

Referring to FIGS. 1 & 6, specifically, in an embodiment of a high geostress fault simulator using non-soil rock materials media to simulate a stress level in a soil mass of a deep formation and study an impact of triaxial earthquake fault dislocation on a to-be-tested model 6, the simulator is disposed in a foundation pit, where the simulator includes: a first movable unit 1, where the first movable unit 1 includes a first support platform 11 and a second support platform 12, the bottom of the first support platform 11 and the bottom of the second support platform 12 are slidably connected to the bottom of the foundation pit, and the first support platform 11 and the second support platform 12 are arranged adjacent to each other and movably connected to enable the first support platform 11 and the second support platform 12 to move relative to or toward each other; a second movable unit 2, where the second movable unit 2 includes a first movable box 21 and a second movable box 22, the interiors of both the first movable box 21 and the second movable box 22 are hollow structures, and the first movable box 21 and the second movable box 22 are in contact to form an accommodation space 23 through the hollow structures; and a stress simulation unit, where the stress simulation unit is arranged in the accommodation space 23 and includes a plurality of stress simulation assemblies 3 enclosed at a preset gap to form a placement zone for placing the to-be-tested model 6 and a pressurization zone for enveloping the periphery of the placement zone, and the stress simulation assemblies 3 are fixedly connected to an inner wall of the first movable box 21 or an inner wall of the second movable box 22, where the first movable box 21 is arranged at the top of the first support platform 11 and movably connected to the first support platform 11, the movement direction of the first movable box 21 relative to the first support platform 11 is perpendicular to the movement direction of the first support platform 11 relative to the second support platform 12, and the second movable box 22 is arranged at the top of the second support platform 22 and drivably connected to the second support platform 22.

Specifically, in the high geostress fault simulator using non-soil rock materials media provided by the embodiment, by enclosing the plurality of stress simulation assemblies 3 at the preset gap to form the pressurization zone and the placement zone, placing the to-be-tested model 6 in the placement zone formed by the stress simulation assemblies 3, and arranging the pressurization zone to envelope the periphery of the placement zone to provide surrounding pressure effects to the to-be-tested model 6 in the placement zone through the pressurization zone, the stress level in the soil mass of the deep formation is simulated for the to-be-tested model 6 through the stress simulation assemblies 3, thereby simulating stress effects on civil engineering structures when they are in the deep formation, and by the accommodation space 23 formed by the first movable box 21 and the second movable box 22, an accommodation space 23 and a test environment are provided for the to-be-tested model 6 and the stress simulation assemblies 3; by arranging the first support platform 11 and the second support platform 12 to be movably connected and both move relative to the foundation pit, the first support platform 11 and the second support platform 12 can also move relative to or toward each other while moving relative to the foundation pit, and by movably arranging the first movable box 21 on the first support platform 1 and the second movable box 22 on the second support platform 12, a relative or opposite movement between the first support platform 11 and the second support platform 12 drives a relative or opposite movement between the first movable box 21 and the second movable box 22 to form a fault effect in a first direction on the to-be-tested model 6 inside the first movable box 21 and the second movable box 22; by moving the first movable box 21 relative to the first support platform 11, the first movable box 21 moves relative to the second movable box 22, thereby forming a fault effect in a second direction on the to-be-tested model 6 inside the first movable box 21 and the second movable box 22; and by drivably connecting the second movable box 22 to the second support platform 12, the second movable box 22 moves relative to the first movable box 21 under a driving action, thereby forming a fault effect in a third direction on the to-be-tested model 6 inside the first movable box 21 and the second movable box 22, where the first direction, the second direction and the third direction of the above-mentioned fault effects are spatially perpendicular to each other in pairs, thereby simulating triaxial fault effects occurring in the deep formation, and further studying an impact of triaxial earthquake fault effects on the civil engineering structures under the stress of the soil mass in the deep formation when an earthquake occurs.

Figure 5:
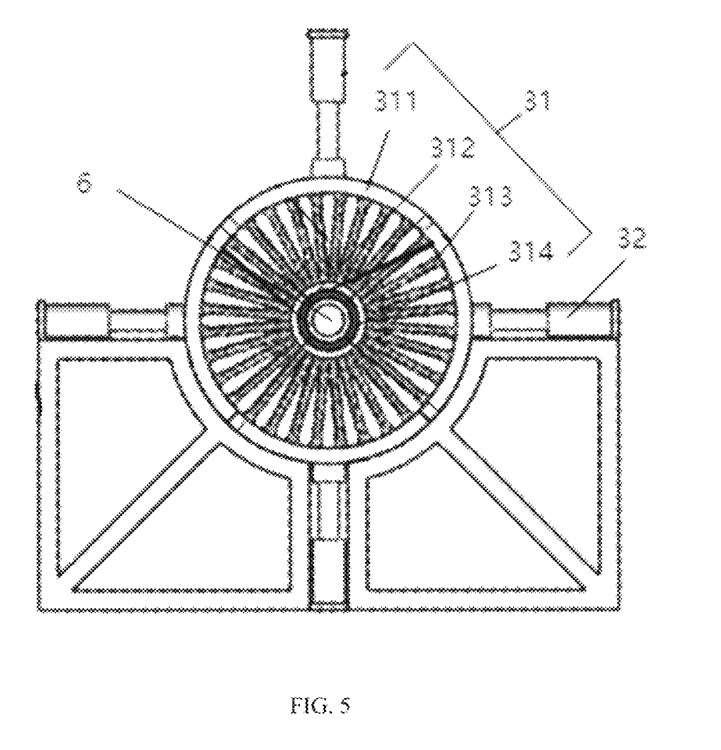
FIG. 5 is a front view of a stress simulation assembly in accordance with the present invention.

In a possible implementation manner, each of the stress simulation assemblies 3 includes: an arc-shaped pressurizer 31 arranged in the accommodation space 23; and a plurality of seventh hydraulic cylinders 32 spaced apart on an outer wall of the arc-shaped pressurizer 31 along an axis direction of the arc-shaped pressurizer 31, each with an output end fixedly connected to the outer wall of the arc-shaped pressurizer 31 and a fixed end opposite to the output end fixedly connected to the inner wall of the first movable box 21 or the inner wall of the second movable box 22.

Further, each of the arc-shaped pressurizers 31 includes: a first arc-shaped plate 311 with a convex face fixedly connected to the output end of the seventh hydraulic cylinder 32; a second arc-shaped plate 312 distributed concentrically with the first arc-shaped plate 311; and a plurality of springs 313 with one end fixed on a concave face of the first arc-shaped plate 311 along an axis direction of the first arc-shaped plate 311 and the other end fixed on a convex face of the second arc-shaped plate 312 along an axis direction of the second arc-shaped plate 312 to form the pressurization zone by the first arc-shaped plate 311 and the second arc-shaped plate 312, where the plurality of arc-shaped pressurizers 31 are arranged around the periphery of the to-be-tested model 6 and surrounded by a plurality of the corresponding second arc-shaped plates 312 to form the placement zone, and the to-be-tested model 6 is disposed in the placement zone to press against the second arch-shaped plates 312 to cause the second arc-shaped plates 312 to move relatively in the pressurization zone.

Specifically, by connecting the seventh hydraulic cylinder 32 to the central axis of the arc-shaped pressurizer 31 in a straight line to support and fix the position of the arc-shaped pressurizer 31, a certain pressure is provided for the arc-shaped pressurizer 31 through a telescopic or driving action of the seventh hydraulic cylinder 32, and after receiving the above pressure, the arc-shaped pressurizer 31 applies a force uniformly from multiple directions to the to-be-tested model 6 placed in the arc-shaped pressurizer 31 to simulate the stress level of the soil mass in the deep formation; and by arranging the arc-shaped pressurizer 31 to be composed of the first arc-shaped plate 311, the second arc-shaped plate 312, and the plurality of springs 313, the second arc-shaped plate 312 forms the placement zone for the to-be-tested model 6 and the plurality of springs 313 between the first arc-shaped plate 311 and the second arc-shaped plate 312 form the pressurization zone so that the seventh hydraulic cylinder 32 compresses the pressurization zone to apply pressures in multiple directions to the to-be-tested model 6.

In the initial setting state, the plurality of stress simulation assemblies are enclosed at a preset interval to form the pressurization zone and the placement zone so that a predetermined interval exists between the plurality of first arc-shaped plates 311 and the seventh hydraulic cylinders 32 on the first arc-shaped plates 311 drive the first arc-shaped plates 311 to move in a direction close to the second arc-shaped plates 312, thereby compressing the springs 313 and adjusting the pressure applied to the to-be-tested model 6 by adjusting the compression degree of the spring 313 in the initial state and the predetermined interval between the first arc plates 311; the natural length of the spring 313 is set to be greater than the difference between the radii of the first arc-shaped plate 311 and the second arc-shaped plate 312 so that during the later driving process based on the initial state, the spring 313 is always in an elastic compression state and by compressing the spring 313, a pressure is exerted on the second arc-shaped plate 312, thereby making the placement zone more stable and better fixing the to-be-tested model 6; and preferably, the diameter of the to-be-tested model 6 can be set to be larger than that of the second arc-shaped plate 312 so that the second arc-shaped plate 312 can fit more closely around the periphery of the to-be-tested model 6 and the pressure can be better transmitted to the to-be-tested model 6 through the second arc-shaped plate 312 when the seventh hydraulic cylinder 32 compresses the arc-shaped pressurizer 31.

Figure 4:
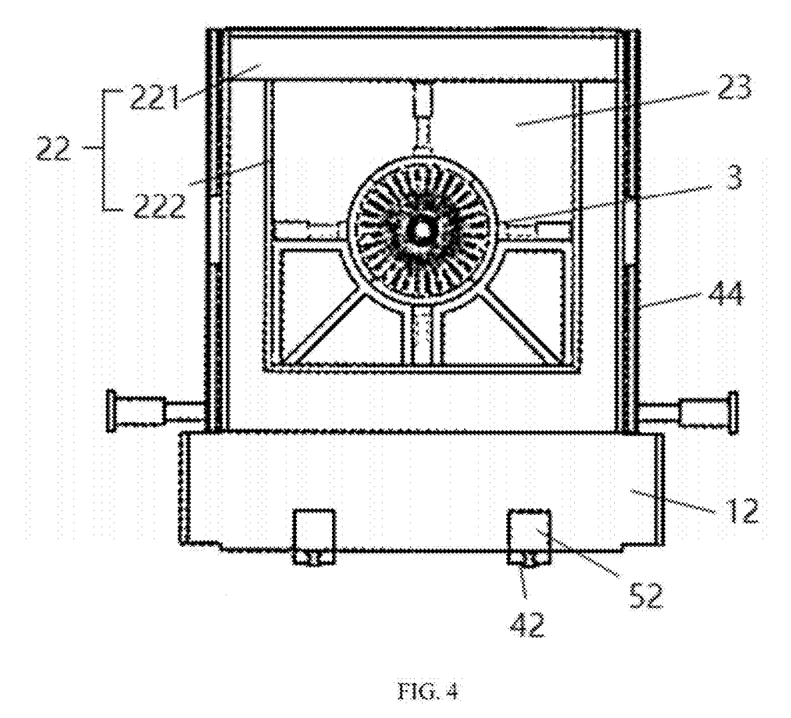
FIG. 4 is a rear view of a high geostress fault simulator using non-soil rock materials media in accordance with the present invention.

As shown in FIG. 4, in a possible implementation manner, the number of the arc-shaped pressurizers 31 is 4, and the 4 arc-shaped pressurizers 31 are distributed symmetrically with an axis direction of the to-be-tested model 6 as the central axis.

In an exemplary implementation manner, the number of the stress simulation assemblies 3 is set to 4, each of the stress simulation assemblies 3 includes one arc-shaped pressurizer 31, the central angle of the first arc-shaped plate 311 and the second arc-shaped plate 312 of the arc-shaped pressurizer 31 is set to 90 degrees, and the 4 stress simulation assemblies 3 are arranged around the periphery of the to-be-tested model 6 at a preset interval so that the 4 first arc-shaped plates 311 are enclosed at the preset interval to form the pressurization zone, the 4 second arc-shaped plates 312 are enclosed to form the placement zone, the to-be-tested model 6 is disposed in the placement zone, the 4 stress simulation assemblies are distributed symmetrically in the center, the seventh hydraulic cylinders 32 in two stress simulation assemblies 3 are arranged in a vertical direction, and the seventh hydraulic cylinders 32 in the other two stress simulation assemblies 3 are arranged in a horizontal direction.

Since the first arc-shaped plates 311 and the second arc-shaped plates 312 in the stress simulation assemblies 3 are made of steel, in order to ensure the stability of pressurization by the arc-shaped pressurizer 31, in a possible implementation manner, the stress simulation unit further includes 2 support frames, which are fixed side by side on both sides of the bottom of the accommodation space 23, an arc-shaped groove is formed at one side of the support frame, and the arc-shaped grooves of the two support frames form a circular recessed area for placing and supporting the arc-shaped pressurizer 31.

In a possible implementation manner, a rubber pad 314 is provided on a concave face of the second arc-shaped plate 312 so that the to-be-tested model 6 abuts against the concave face of the second arc-shaped plate 312 through the rubber pad 314, thereby pressing against the to-be-tested model 6 through the rubber pad 314 to make the pressure received by the to-be-tested model 6 more uniform and stable.

In a possible implementation manner, the top of the first movable box 21 is an opening provided with a detachable first top plate 211, and the top of the second movable box 22 is also an opening provided with a detachable second top plate 221.

Specifically, the opening at the top of the first movable box 21 and the opening at the top of the second movable box 22 are connected with the accommodation space 23, and the first top plate 211 and the second top plate 221 are detachably provided to facilitate placing components into the accommodating space 23 after opening the first top plate 211 and/or the second top plate 221.

For the convenience of observation and recording of test conditions during the test, in a possible implementation manner, a first transparent glass plate 212 is provided on a side of the first movable box 21 away from the second movable box 22 so that the to-be-tested model 6 inside the accommodation space 23 is observable through the first transparent glass plate 212; and/or a second transparent glass plate 222 is provided on a side of the second movable box 22 away from the first movable box 21 so that the to-be-tested model 6 inside the accommodation space 23 is observable through the second transparent glass plate 222.

In a possible implementation manner, a first guide rail 41 is arranged between the bottom of the first support platform 11 and the bottom of the foundation pit, with a fixed part thereof fixedly installed at the bottom of the foundation pit and a movable part thereof fixedly installed at the bottom of the first support platform 11, and the fixed part is embedded in the movable part and can slide relative to the movable part; a second guide rail 42 is arranged between the bottom of the second support platform 12 and the bottom of the foundation pit, with a fixed part thereof fixedly installed at the bottom of the foundation pit and a movable part thereof fixedly installed at the bottom of the second support platform 12, and the fixed part is embedded in the movable part and can slide relative to the movable part; a third guide rail 43 is arranged at a movable connection between the first movable box 21 and the first support platform 11, with a fixed part thereof fixedly installed on the first support platform 11 and a movable part thereof fixedly installed on the first movable box 21, and the fixed part is embedded in the movable part and can slide relative to the movable part; and a fourth guide rail 44 is arranged on side walls of the second movable box 22 and the foundation pit, with a fixed part thereof fixedly installed on the side wall of the foundation pit and a movable part thereof fixedly installed on the side wall of the second movable box 22, and the fixed part is embedded in the movable part and can slide relative to the movable part, where the first guide rail 41 and the second guide rail 42 are arranged in parallel so that the first support platform 11 can move relative to or toward the second support platform 12, the first guide rail 41, the third guide rail 43, and the fourth guide rail 44 are arranged perpendicular to each other in pairs, and the first guide rail 41 is arranged parallel to the telescopic direction of the third hydraulic cylinder 53.

In a possible implementation manner, a plurality of first hydraulic cylinders 51 are provided between a side wall of the first support platform 11 and the side wall of the foundation pit, each with a fixed end fixedly connected to the side wall of the foundation pit and an output end fixedly connected to the side wall of the first support platform 11; a plurality of second hydraulic cylinders 52 are provided between a side wall of the second support platform 12 and the side wall of the foundation pit, each with a fixed end fixedly connected to the side wall of the foundation pit and an output end fixedly connected to the side wall of the second support platform 12; and a third hydraulic cylinder 53 and a fourth hydraulic cylinder 54 are connected between the first support platform 11 and the second support platform 12, the third hydraulic cylinder 53 has a fixed end fixedly connected to another side wall of the first support platform 11 and an output end fixedly connected to another side wall of the second support platform 12, and the fourth hydraulic cylinder 54 has an output end fixedly connected to another side wall of the first support platform 11 and a fixed end fixedly connected to another side wall of the second support platform 12, where the telescopic directions of the first hydraulic cylinders 51, the second hydraulic cylinders 52, the third hydraulic cylinder 53, and the fourth hydraulic cylinder 54 are parallel.

In a possible implementation manner, a plurality of fifth hydraulic cylinders 55 are provided between a side wall of the first movable box 21 adjacent to the second movable box 22 and the side wall of the foundation pit, each with a fixed end fixedly connected to the side wall of the foundation pit and an output end fixedly connected to the side wall of the first movable box 21, and the telescopic direction of the fifth hydraulic cylinders 55 is perpendicular to that of the first hydraulic cylinders 51; and a plurality of sixth hydraulic cylinders 56 are provided inside the second support platform 12, each with a fixed end fixed to the bottom of the second support platform 12 and an output end fixedly connected to the bottom of the second movable box 22 so that the sixth hydraulic cylinders 56 drive the second movable box 22 to move relative to the first movable box 21, where the telescopic directions of the sixth hydraulic cylinders 56, the first hydraulic cylinders 51, and the fifth hydraulic cylinders 55 are spatially perpendicular to each other in pairs.

Specifically, by simultaneously controlling the driving and expansion/retraction of the first hydraulic cylinders 51, the second hydraulic cylinders 52, the third hydraulic cylinder 53, and the fourth hydraulic cylinder 54, the first support platform 11 and the second support platform 12 move relative to the foundation pit or toward each other through the first guide rail 41 and the second guide rail 42, thereby controlling the relative or opposite movement of the first movable box 21 and the second movable box 22 and thus forming a fault effect in a first direction on the to-betested model 6; by controlling the driving and expansion/retraction of the fifth hydraulic cylinders 55, the first movable box 21 moves relative to the first support platform 11 through the third guide rail 43, thereby causing the first movable box 21 to move relative to the second movable box 22 and thus forming a fault effect in a second direction on the to-be-tested model 6; and by controlling the driving and expansion/retraction of the sixth hydraulic cylinders 56, the second movable box 22 moves relative to the foundation pit and the first support platform 11 through the fourth guide rail 44, thereby causing the second movable box 22 to move relative to the first movable box 21 and thus forming a fault effect in a third direction on the to-be-tested model 6, where the first direction, the second direction and the third direction of the above-mentioned fault effects are perpendicular to each other in pairs, and the faults in these three directions are acted on the to-be-tested model 6 at a certain stress level individually or simultaneously to study an impact of uniaxial, biaxial, and triaxial earthquake fault motions on the to-be-tested model 6 at the certain stress level.

It should be noted that the structures, proportions, sizes, etc. shown in the accompanying drawings of the specification are only intended for matching the content disclosed herein and facilitating the understanding and reading of those skilled in the art rather than for limiting the implementation conditions of the present invention. Therefore, they have no technically substantial significance, and any structural modifications, changes in proportions, or adjustments in size, without affecting the effects and objectives that the present invention can produce and achieve, shall still fall within the scope of technical content disclosed in the present invention. Meanwhile, the terms such as "upper", "lower", "left", "right", "middle", and "one" as used herein are only for the convenience of description rather than for limiting the implementation scope of the present invention, and changes or adjustments in their relative relationships, without substantially changing the technical content, shall also be deemed to fall within the implementation scope of the present invention.

The above-described embodiments are only exemplary embodiments of the present invention and constitute no restriction in any form on the present invention. Although the present invention has been disclosed above with exemplary embodiments, such exemplary embodiments are not intended to limit the present invention, and those skilled in the art can make some changes or modifications to equivalent embodiments with equivalent changes by reference to the technical content disclosed above without departing from the scope of the technical solutions of the present invention. However, any simple revisions, equivalent changes, and modifications made to the above embodiments in accordance with the technical essence of the present invention without departing from the content of the technical solutions of the present invention shall still fall within the scope of the technical solutions of the present invention.

What is claimed is:

1. A high geostress fault simulator using non-soil rock materials media to simulate a stress level in a soil mass of a deep formation and study an impact of triaxial earthquake fault dislocation on a to-be-tested model (6), wherein the simulator is disposed in a foundation pit and comprises:
   a first movable unit (1), wherein the first movable unit (1) comprises a first support platform (11) and a second support platform (12), the bottom of the first support platform (11) and the bottom of the second support platform (12) are slidably connected to the bottom of the foundation pit, and the first support platform (11) and the second support platform (12) are arranged adjacent to each other and movably connected to enable the first support platform (11) and the second support platform (12) to move relative to or toward each other;
   a second movable unit (2), wherein the second movable unit (2) comprises a first movable box (21) and a second movable box (22), the interiors of both the first movable box (21) and the second movable box (22) are hollow structures, and the first movable box (21) and the second movable box (22) are in contact to form an accommodation space (23) through the hollow structures; and
   a stress simulation unit, wherein the stress simulation unit is arranged in the accommodation space (23) and comprises a plurality of stress simulation assemblies (3) enclosed at a preset gap to form a placement zone for placing the to-be-tested model (6) and a pressurization zone for enveloping the periphery of the placement zone, and the stress simulation assemblies (3) are fixedly connected to an inner wall of the first movable box (21) or an inner wall of the second movable box (22), wherein
   the first movable box (21) is arranged at the top of the first support platform (11) and movably connected to the first support platform (11), the movement direction of the first movable box (21) relative to the first support platform (11) is perpendicular to the movement direction of the first support platform (11) relative to the second support platform (12), and the second movable box (22) is arranged at the top of the second support platform (12) and drivably connected to the second support platform (12);
   each of the stress simulation assemblies (3) comprises:
   an arc-shaped pressurizer (31) arranged in the accommodation space (23); and
   a plurality of seventh hydraulic cylinders (32) spaced apart on an outer wall of the arc-shaped pressurizer (31) along an axis direction of the arc-shaped pressurizer (31), each with an output end fixedly connected to the outer wall of the arc-shaped pressurizer (31) and a fixed end opposite to the output end fixedly connected to the inner wall of the first movable box (21) or the inner wall of the second movable box (22);
   each of the arc-shaped pressurizers (31) comprises:
   a first arc-shaped plate (311) with a convex face fixedly connected to the output end of the seventh hydraulic cylinder (32);
   a second arc-shaped plate (312) distributed concentrically with the first arc-shaped plate (311); and
   a plurality of springs (313) with one end fixed on a concave face of the first arc-shaped plate (311) along an axis direction of the first arc-shaped plate (311) and the other end fixed on a convex face of the second arc-shaped plate (312) along an axis direction of the second arc-shaped plate (312) to form the pressurization zone by the first arc-shaped plate (311) and the second arc-shaped plate (312), wherein
   the plurality of arc-shaped pressurizers (31) are arranged around the periphery of the to-be-tested model (6) and surrounded by a plurality of the corresponding second arc-shaped plates (312) to form the placement zone, and the to-be-tested model (6) is disposed in the placement zone to press against the second arch-shaped plates (312) to cause the second arc-shaped plates (312) to move relatively in the pressurization zone;
   the number of the arc-shaped pressurizers (31) is 4, and the 4 arc-shaped pressurizers (31) are distributed symmetrically with an axis direction of the to-be-tested model (6) as the central axis;

a rubber pad (314) is provided on a concave face of the second arc-shaped plate (312) so that the to-be-tested model (6) abuts against the concave face of the second arc-shaped plate (312) through the rubber pad (314);

the top of the first movable box (21) is an opening provided with a detachable first top plate (211), and the top of the second movable box (22) is also an opening provided with a detachable second top plate (221);

a first transparent glass plate (212) is provided on a side of the first movable box (21) away from the second movable box (22) so that the to-be-tested model (6) inside the accommodation space (23) is observable through the first transparent glass plate (212); and/or a second transparent glass plate (222) is provided on a side of the second movable box (22) away from the first movable box (21) so that the to-be-tested model (6) inside the accommodation space (23) is observable through the second transparent glass plate (222);

a first guide rail (41) is arranged between the bottom of the first support platform (11) and the bottom of the foundation pit, with a fixed part thereof fixedly installed at the bottom of the foundation pit and a movable part thereof fixedly installed at the bottom of the first support platform (11), and the fixed part is embedded in the movable part and can slide relative to the movable part;

a second guide rail (42) is arranged between the bottom of the second support platform (12) and the bottom of the foundation pit, with a fixed part thereof fixedly installed at the bottom of the foundation pit and a movable part thereof fixedly installed at the bottom of the second support platform (12), and the fixed part is embedded in the movable part and can slide relative to the movable part;

a third guide rail (43) is arranged at a movable connection between the first movable box (21) and the first support platform (11), with a fixed part thereof fixedly installed on the first support platform (11) and a movable part thereof fixedly installed on the first movable box (21), and the fixed part is embedded in the movable part and can slide relative to the movable part; and a fourth guide rail (44) is arranged on side walls of the second movable box (22) and the foundation pit, with a fixed part thereof fixedly installed on the side wall of the foundation pit and a movable part thereof fixedly installed on the side wall of the second movable box (22), and the fixed part is embedded in the movable part and can slide relative to the movable part, wherein the first guide rail (41) and the second guide rail (42) are arranged in parallel so that the first support platform (11) can move relative to or toward the second support platform (12), the first guide rail (41), the third guide rail (43), and the fourth guide rail (44) are arranged perpendicular to each other in pairs, and the first guide rail (41) is arranged parallel to the telescopic direction of the third hydraulic cylinder (53);

a plurality of first hydraulic cylinders (51) are provided between a side wall of the first support platform (11) and the side wall of the foundation pit, each with a fixed end fixedly connected to the side wall of the foundation pit and an output end fixedly connected to the side wall of the first support platform (11);

a plurality of second hydraulic cylinders (52) are provided between a side wall of the second support platform (12) and the side wall of the foundation pit, each with a fixed end fixedly connected to the side wall of the foundation pit and an output end fixedly connected to the side wall of the second support platform (12); and a third hydraulic cylinder (53) and a fourth hydraulic cylinder (54) are connected between the first support platform (11) and the second support platform (12), the third hydraulic cylinder (53) has a fixed end fixedly connected to another side wall of the first support platform (11) and an output end fixedly connected to another side wall of the second support platform (12), and the fourth hydraulic cylinder (54) has an output end fixedly connected to another side wall of the first support platform (11) and a fixed end fixedly connected to another side wall of the second support platform (12), wherein the telescopic directions of the first hydraulic cylinders (51), the second hydraulic cylinders (52), the third hydraulic cylinder (53), and the fourth hydraulic cylinder (54) are parallel;

a plurality of fifth hydraulic cylinders (55) are provided between a side wall of the first movable box (21) adjacent to the second movable box (22) and the side wall of the foundation pit, each with a fixed end fixedly connected to the side wall of the foundation pit and an output end fixedly connected to the side wall of the first movable box (21), and the telescopic direction of the fifth hydraulic cylinders (55) is perpendicular to that of the first hydraulic cylinders (51); and a plurality of sixth hydraulic cylinders (56) are provided inside the second support platform (12), each with a fixed end fixed to the bottom of the second support platform (12) and an output end fixedly connected to the bottom of the second movable box (22) so that the sixth hydraulic cylinders (56) drive the second movable box (22) to move relative to the first movable box (21), wherein the telescopic directions of the sixth hydraulic cylinders (56), the first hydraulic cylinders (51), and the fifth hydraulic cylinders (55) are spatially perpendicular to each other in pairs.

* * * * *